Figure 4:
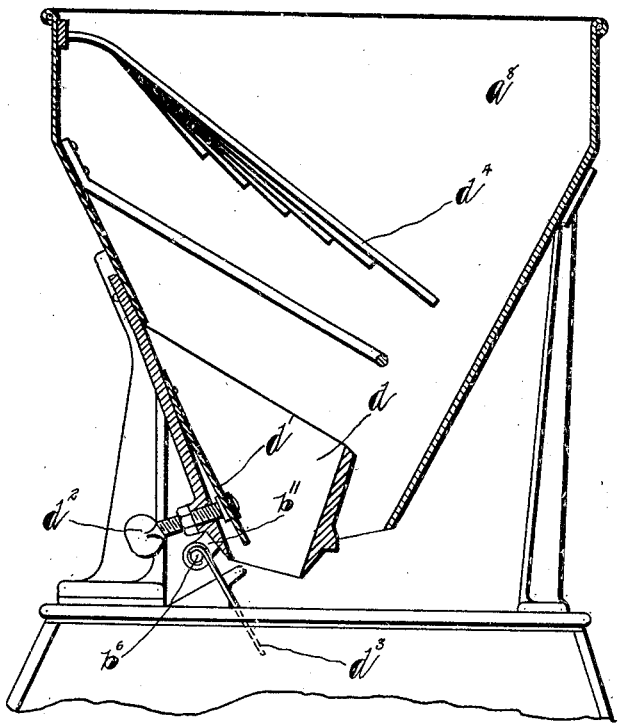

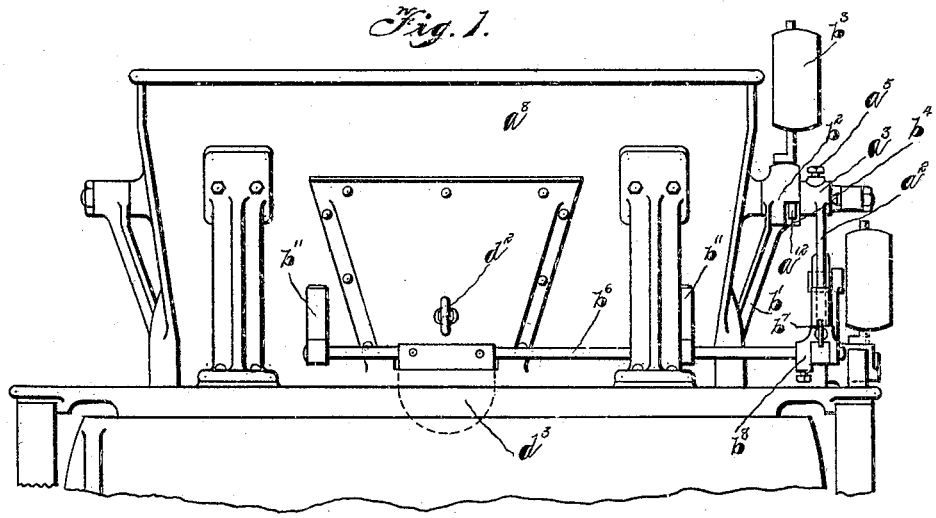
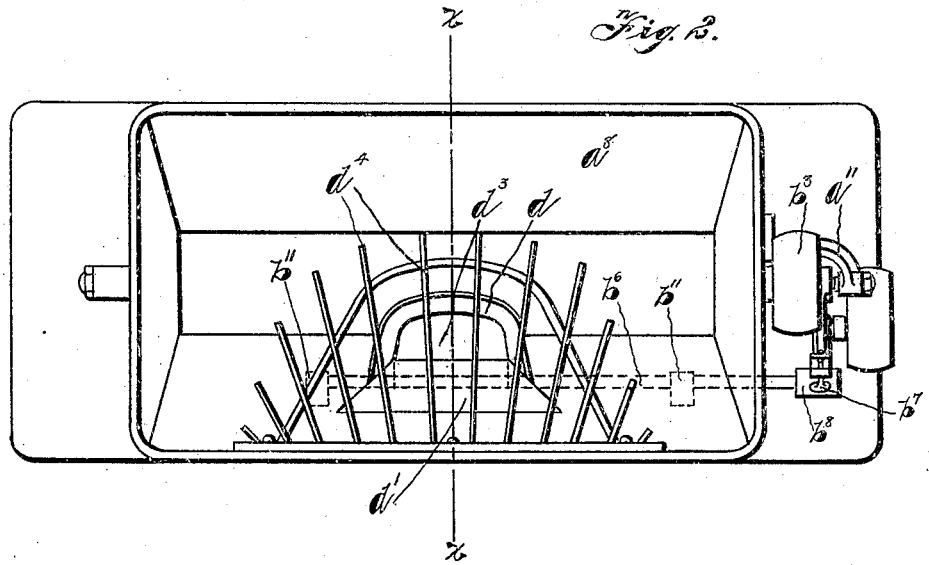

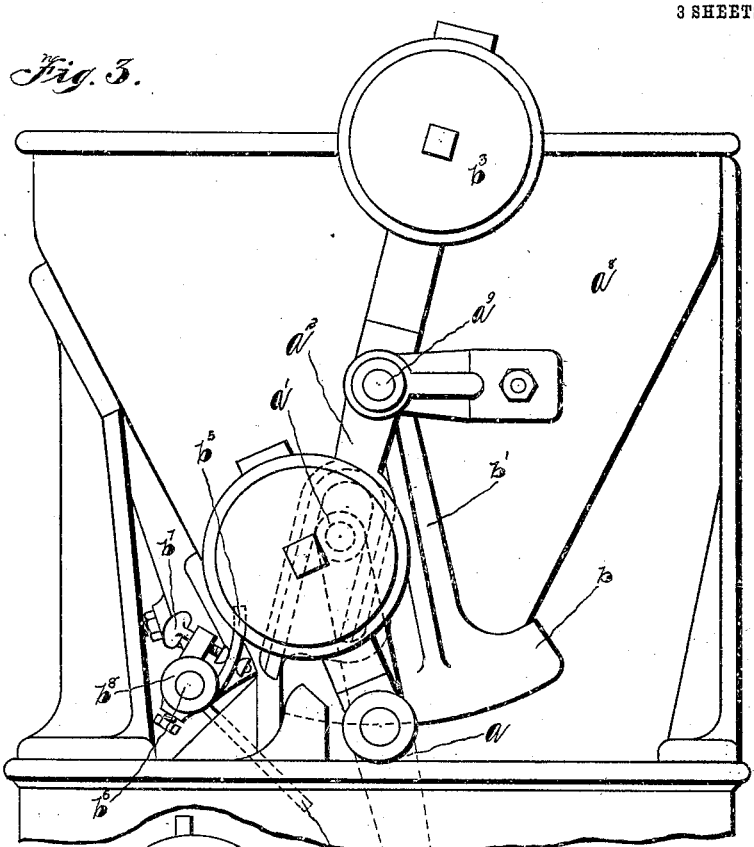
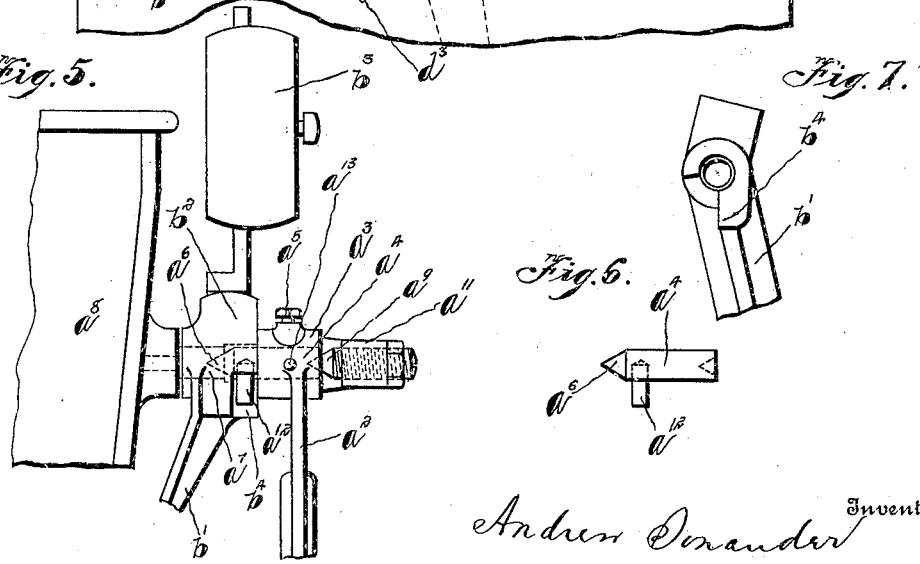

UNITED STATES PATENT OFFICE.

ANDREW SONANDER, OF SPRINGFIELD, OHIO, ASSIGNOR TO THE WINTERS-COLEMAN SCALE COMPANY, OF SPRINGFIELD, OHIO, A CORPORATION OF OHIO.

AUTOMATIC WEIGHING APPARATUS.

952,587.      Specification of Letters Patent.      Patented Mar. 22, 1910.

Application filed April 20, 1909. Serial No. 491,152.

*To all whom it may concern:*

Be it known that I, ANDREW SONANDER, a citizen of the United States, residing at Springfield, in the county of Clark and State of Ohio, have invented certain new and useful Improvements in Automatic Weighing Apparatus, of which the following is a specification.

My invention relates to improvements in automatic weighing apparatus, and particularly to mechanism for controlling the supply of material to the movable receptacle.

My object has been to construct such mechanism so as to contribute to the accuracy, capacity and efficiency of automatic weighing apparatus.

My mechanism is especially adapted for use in an apparatus of the character described in my pending application No. 409,109 filed January 3, 1908.

The accompanying drawings and descriptions illustrate and describe a preferred form of my improvements.

Figure 1 is a front elevation. Fig. 2 is a top plan view. Fig. 3 is an end view of feed gate and dribble gate and connecting mechanism. Fig. 4 is a sectional view of the stationary receptacle or feed hopper and dribble hopper on the line $x$ $x$ of Fig. 2. Fig. 5 is an enlarged view of the parts shown in Fig. 3 with the stationary receptacle cut away. Figs. 6 and 7 are detail views.

Like parts are represented by similar letters of reference in the several views.

In my pending application, Ser. No. 409,109, I have preferably shown an intermediate forked lever, $a$ (see Fig. 3) operatively connected with a swinging pendant as shown and described in said prior application. This intermediate lever is supported and operated in the manner fully described in the said application. At its upper free end it carries an anti-friction roller, $a^1$, which operatively connects with a forked arm, $a^2$. This forked arm is formed with a boss or hub, $a^3$, (see Fig. 5) on or secured to the spindle or shaft, $a^4$, by means of a set screw, $a^5$. Said spindle (see Fig. 6) is formed with a tapered end, $a^6$, which fits in a bearing or socket formed in the end of the bearing stud, $a^7$, secured to the stationary hopper, $a^8$. The opposite end of the spindle, $a^4$, is formed with a socket or concave bearing and the tapered-end screw bolt, $a^9$, is adapted to fit within said bearing. This bolt is fitted with a lock nut and is supported within a housing at the free end of the bracket, $a^{11}$, (see Fig. 2) which bracket is secured to the stationary hopper, $a^8$. The spindle, $a^4$, carries a lug, $a^{12}$, (see Figs. 6 and 5) which coöperates with the forked arm, $a^2$, to open the main gate. The main gate, $b$, (Fig. 3) is preferably formed with an arm, $b^1$, which at its upper end is formed with a hub, $b^2$, and from said hub projects the counterbalance and arm, $b^3$. This hub is pivotally mounted on said bearing stud, $a^7$, and is formed to extend beyond the end of said bearing stud and to receive the spindle, $a^4$, which is loosely housed therein. A segment opening is formed in this extension (see Fig. 7) to receive the lug, $a^{12}$.

In assembling the parts mentioned, it is apparent that the main gate and counterbalance may first be placed in position, as indicated in Fig. 5, and the forked arm, $a^2$, with its projecting spindle, $a^4$, is then fitted so that the tapered end of the spindle projects through the hub, $b^2$, and within the socket bearing in the stud, $a^7$, and this hub, $a^3$, is so adjusted that the lug, $a^{12}$, will properly coöperate with the hub, $b^2$.

The operation of the parts just mentioned is such that when the intermediate forked lever, $a$, is retracted to normal position by the closing of the discharge gate of the movable hopper, as fully explained in my previous applications, it oscillates the arm, $a^2$, and with it the spindle, $a^4$, and the projecting lug, $a^{12}$. The latter engages with the hub, $b^2$, of the arm, $b^1$, of the main gate and retracts said gate to its open position. When the pendant swings forward and the main gate, $b$, closes by gravity, as explained in said previous application, the forked arm, $a^2$, has a limited additional movement independent of said main gate by reason of the play of the lug, $a^{12}$ in the segmental opening in the hub, $b^2$. This movement is utilized for closing the supplemental or dribble gate, $d^3$. During this additional movement the end of the forked arm, $a^2$, contacts with an adjustable shoe, $b^5$, (see Fig. 3.) This shoe is pivotally secured to the shaft, $b^6$, and is adjusted by the thumb screw, $b^7$. This thumb screw is supported by the yoke, $b^8$, which is rigidly secured to the shaft, $b^6$. The dribble gate, $d^3$, is also rigidly secured to this shaft. Said shaft is supported in the bearings, $b^{11}$, secured to the stationary hopper. That arrangement of the parts is such that when the shoe, $b^5$, is operated by the forked end of the arm, $a^2$, the rock shaft, $b^6$, is oscillated so that the dribble gate, $d^3$, is thrown to its closed position. It opens by gravity when the feed gate is opened.

The outlet $d$, is constructed with a relatively small discharge opening. The size of this outlet $d$, is regulated by the throttle plate, $d^1$, (Figs. 2 and 4) the top thereof being fastened to the side of the hopper, $d$, the bottom hanging free. It is operated by the thumb screw, $d^2$, (Figs. 1 and 4) by means of which the throttle plate can either be pushed in decreasing the size of the outlet, or drawn back increasing the size so as to adapt it to different kinds of material. The said opening is closed by the gate, $d^3$, supported on the shaft, as previously explained.

$d^4$, is a screen, preferably constructed of diverging prongs or tines, (Fig. 2) rigidly fastened to the top of the hopper, $a^8$. These tines slope downward completely covering, or screening, the bottom of hopper $a^8$, so the incoming stream of grain is screened and then fills the hopper $a^8$, and outlet $d$.

The outlet, $d$, is built in a suitable feed hopper, $a^8$, provided to supply or feed the material to the weigh hopper. Clearance is provided between the screen, $d^4$, and the sides of the feed hopper (Fig. 2) other than the side to which the outlet tube may be secured.

For the purpose of contributing to the capacity of the scale the gate, $d^3$, is adapted to open simultaneously with the opening of the main gate.

In the operation when the main gate is opened the dribble gate opens by gravity, plus the weight of the material thereon, and the material is supplied to the weigh hopper through both the discharge for feed hopper and the discharge opening of outlet $d$. When the feed gate closes, the supply of material to the weigh hopper continues in reduced volume through the outlet $d$, until the former hopper receives its load, then the dribble gate is also closed cutting off the supply of material.

It will be plain that, by having means for regulating the capacity of the dribble outlet, I am able to adapt this capacity to various materials and thus secure the minimum practical dribble for each material. Also, that having means for screening the material that is received in the dribble outlet I am able to secure an approximately uniform flow of material from the outlet thereof.

Having thus described my invention, I claim:

1. In a weighing machine, the combination of a stationary hopper, a plurality of gates including a main and dribble gate normally in open position, an actuating device, an intermediate device connected to said main gate operated by said actuating device for restoring said main gate to open position, and devices connected to said dribble gate also operated by the actuating device for positively closing said dribble gate subsequent to the closing of the main gate, substantially as specified.

2. In a weighing machine, a stationary hopper, a plurality of gates including main and dribble gates, both said gates being normally open, actuating means, and connections to said dribble gate, operated by said actuating device whereby said dribble gate will be positively closed and connections to the main gate operated by said actuating device for positively opening thereafter the main gate for purposes specified.

3. In a weighing machine, the combination of a plurality of swinging gates including a main and dribble gate, a swinging crank arm and a forked arm engaging the end of said crank arm, means coupling at predetermined times said forked arm with the main gate whereby said forked arm has a limited movement independent of said gate, and means connecting said forked arm with said dribble gate for positively operating said gate to its closing position during the independent movement of said forked arm, substantially as specified.

4. In a weighing machine, the combination of a main gate, a dribble gate, and an actuating device providing a swinging arm, a supplemental arm connected therewith, means connecting said actuating device with said main gate for restoring said main gate to normal or open position but permitting said actuating device to have a limited movement independent of said main gate, and means connecting said actuating device with the dribble gate for closing said dribble gate during the end of its closing movement, substantially as specified.

5. In a weighing machine, the combination of main and dribble gates normally open, a swinging arm for actuating the gates at predetermined times, connections to the main gate operated by said arm for restoring the main gate to normal position, the connections and arm being so arranged that the arm will move a limited distance independent of the gate and an adjustable connecting device between the dribble gate and said arm for positively closing said dribble gate, substantially as specified.

6. In a weighing machine, the combination of a stationary hopper, a main outlet and a supplemental outlet for said hopper, a main gate for said main outlet and a dribble gate for said supplemental outlet, means for holding both of said gates in open position, an actuating device for closing the main gate, and means for connecting same with the dribble gate for positively closing said dribble gate after the closing of the main gate, and an adjustable throttle plate for said supplemental outlet, substantially as specified.

7. In a weighing machine, the combination of a feed hopper, and a supplemental outlet therein arranged to permit the overflow of the grain from the supplemental outlet to discharge into the feed hopper, a main gate coöperating with the feed hopper, and a dribble gate coöperating with the dribble outlet, an adjustable throttle plate within said supplemental outlet, an actuating device for operating the main gate in normal or open position, and means connecting said actuating device with the dribble gate for closing said dribble gate after the main gate has been closed, and means for holding the main gate and dribble gate simultaneously in open position, substantially as specified.

8. In a weighing machine, the combination of a stationary feed hopper, a main gate, an actuating device, a bearing for said gate and actuating device comprising a stationary bearing stud, and a spindle projecting within one end of said stud, and means for adjusting the actuating device on said stud, means connecting the actuating device with the main gate for restoring same to open position during the retracting movement of said actuating device, a dribble gate, and means connecting said dribble gate with said actuating device for closing said dribble gate during the opposite movement of said actuating device from that previously mentioned, for the purpose specified.

In testimony whereof, I have hereunto set my hand this 18th day of March, 1909.

ANDREW SONANDER.

Witnesses:
 CHAS. I. WELCH,
 OLIVER F. CLARKE.